US012726089B2

(12) United States Patent
Agapiou et al.

(10) Patent No.: US 12,726,089 B2
(45) Date of Patent: Sep. 1, 2026

(54) METHOD TO PRODUCE ELECTRIC MOTOR CONDUCTOR WIRES FOR HIGH FREQUENCY

(71) Applicant: GM GLOBAL TECHNOLOGY OPERATIONS LLC, Detroit, MI (US)

(72) Inventors: John S. Agapiou, Rochester Hills, MI (US); Qigui Wang, Rochester Hills, MI (US); Lei Hao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 760 days.

(21) Appl. No.: 18/101,395

(22) Filed: Jan. 25, 2023

(65) Prior Publication Data

US 2024/0250590 A1 Jul. 25, 2024

(51) Int. Cl.

| | |
|---|---|
| ***H02K 15/0421*** | (2025.01) |
| ***B21D 5/16*** | (2006.01) |
| ***H02K 3/02*** | (2006.01) |

(52) U.S. Cl.
CPC .......... *H02K 15/0421* (2013.01); *B21D 5/16* (2013.01); *H02K 3/02* (2013.01)

(58) Field of Classification Search
CPC ...... H02K 15/0421; H02K 3/02; H01B 13/00; H01B 13/0036; H01B 1/00; H01B 1/02; H01B 1/026; H01B 5/02
See application file for complete search history.

(56) References Cited

U.S. PATENT DOCUMENTS

| | | | | |
|---|---|---|---|---|
| 3,096,577 | A * | 7/1963 | Carlson | B21C 1/00 228/231 |
| 2002/0081528 | A1 | 6/2002 | Miyajima et al. | |
| 2019/0027988 | A1 | 1/2019 | Filipenko et al. | |
| 2020/0295611 | A1 | 9/2020 | Husain et al. | |
| 2021/0241942 | A1* | 8/2021 | Franks | C08K 3/041 |
| 2023/0016467 | A1* | 1/2023 | Kladitis | B21D 39/02 |

FOREIGN PATENT DOCUMENTS

| | | |
|---|---|---|
| JP | 2008108583 A | 5/2008 |

* cited by examiner

*Primary Examiner* — Livius R. Cazan

(57) ABSTRACT

A method of making a conductor includes folding/stacking/rolling an ultra-conducting copper foil into a multiple layer folded/stacked/rolled ultra-conducting copper foil. Cladding the multiple layer folded/stacked/rolled ultra-conducting coper foil with one of copper and aluminum into a cladded folded/stacked/rolled ultra-conducting copper foil and plastically deforming the cladded folded/stacked/rolled ultra-conducting copper foil into one of a cladded ultra-conducting copper wire, bar, and cable.

17 Claims, 2 Drawing Sheets

METHOD TO PRODUCE ELECTRIC MOTOR CONDUCTOR WIRES FOR HIGH FREQUENCY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a method of producing electric motor conductor wires for high frequency.

A conventional hairpin conductor (magnet wire) is cut from extruded metal bar stock, bent into a U-shaped winding, and inserted into slots of the stator's core. AC current flowing through a single wire conductor increasingly pushes the current toward the surface "skin" of the conductor as frequency increases. Skin effect is defined as the tendency of an AC current to distribute in a non-uniform manner within a magnet wire such that the current density is largest near the surface of the conductor, and decreases with greater depths as one moves inward towards the center of the conductor. The electric current tends to avoid travel through the center of the solid conductor and flows mainly at the "skin" of the conductor, between the outer surface and a level called the "skin depth". This physical phenomenon accelerates the wire's AC resistance in direct proportion to the frequency of the current. Over 98% of the current will flow within a layer 4 times the skin depth from the surface. This behavior is distinct from that of direct current which usually will be distributed evenly over the cross-section of the wire. Accordingly, it is desirable to find ways to eliminate the skin effect in AC motors.

The maximum conductor skin depth may be calculated as:

$$\delta_{max}=2/\rho\mu\omega_{MAX}$$

where $\omega_{MAX}$ is the maximum conductor skin depth of the unitary hairpin bar; $\rho$ is an electrical resistivity of an electrically conductive material of the wires; $\omega_{MAX}$ is a maximum angular current frequency as a function of the peak operating frequency of the electric machine; and $\mu=\mu_r\mu_0$, where $\mu_0$ is a vacuum permeability and $\mu_r$ is a relative magnetic permeability of the electrically conductive material of the wires.

Litz Wire is a multi-strand round wire used to conduct alternating current (AC) at radio frequencies. Individually very small, round magnet wires are braided together which helps reduce AC losses from skin effects and proximity effects found in high-frequency windings. However, a bundle of round wire strands does not result in a very dense conductor due to excess empty space between wires.

Oak Ridge National Lab (ORNL) has designed commercially viable fabrication approaches and material formulations to produce high-performance foil/tape-based ultra-conductive coppers (UCCs). These UCC materials achieve >5% reduction in resistance, >10% increase in ampacity, and >10% improvement in strength compared with commercial pure Cu. The basic approach to UCC fabrication includes formulating stable carbon nanotube (CNT) dispersions, depositing CNTs on Copper tapes, sputtering thin copper overlayers over the CNTs, and thermal annealing.

SUMMARY

A method for making conductor wire/bar/cable (magnet wire) has been proposed to improve electric conductivity and performance of electric motors. Ultra-conducting copper (UCC) tapes/foils (~25 um thick) are first folded, stacked or rolled into the cylindrical or cubic roll shape and then cladded with either copper or aluminum on the outer perimeter. After cladding, the UCC/Cu or UCC/Al bars are further plastically deformed by drawing or extrusion to produce the conductor wire/bar/cable with the geometry and dimensions for the electric motor applications such as hairpins. Each hairpin winding is formed from a collimated number of thin UCC/Cu bars/wires/cables that are bundled together into a unitary bar/wire/cable conductor. It is expected the electric UCC conductor materials achieve >5% reduction in resistance, >10% increase in ampacity, and >10% improvement in strength compared with commercial pure Cu.

According to an aspect of the present disclosure, a method of making a conductor includes folding an ultra-conducting copper foil into a multiple layer folded ultra-conducting copper foil. Cladding the multiple layer folded ultra-conducting coper foil with one of copper and aluminum into a cladded folded ultra-conducting copper foil and plastically deforming the cladded folded ultra-conducting copper foil into one of a cladded ultra-conducting copper wire, bar, and cable.

According to a further aspect, the one of a cladded ultra-conducting copper wire, bar and cable is formed into a hairpin winding that is inserted into slots of a stator core of an electric motor.

According to a further aspect, the ultra-conducting copper foil is made from a continuous Cu tape coated with a layer of aligned carbon nanotubes. The tape could also be made using other techniques to incorporate the carbon nanomaterial within a Cu tape or Cu thin sheet/strip. For example, Cu-Graphene extruded composite film or thin sheet can be used.

According to a further aspect, the ultra-conducting copper foil has a coating that provides a lower resistance than copper foil.

According to a further aspect, the ultra-conducting copper foil is stacked with a copper foil and each of the ultra-conducting copper foil and the copper foil are folded to form the multiple layer folded ultra-conducting copper foil.

According to an aspect of the present disclosure, a method of making a conductor includes stacking an ultra-conducting copper foil into a multiple layer stacked ultra-conducting copper foil. The stacked ultra-conducting coper foil is cladded with one of copper and aluminum into a cladded stacked ultra-conducting copper foil. The cladded stacked ultra-conducting copper foil is plastically deformed into one of a cladded ultra-conducting copper wire, bar, and cable.

According to a further aspect, the stacking the ultra-conducting copper foil includes stacking copper foil with the ultra-conducting copper foil to form the multiple layer folded ultra-conducting copper foil.

According to an aspect of the present disclosure, a method of making a conductor includes rolling an ultra-conducting copper foil into a multiple layer rolled ultra-conducting coper foil. The rolled ultra-conducting coper foil is cladded with one of copper and aluminum into a cladded rolled ultra-conducting copper foil. The cladded rolled ultra-conducting copper foil is plastically deformed into one of a cladded ultra-conducting copper wire, bar, and cable.

According to a further aspect, the rolling the ultra-conducting copper foil includes stacking copper foil with the ultra-conducting copper foil and rolling the stack of ultra-conducting copper foil with copper foil to form the multiple layer rolled ultra-conducting copper foil.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figures 3, 4:
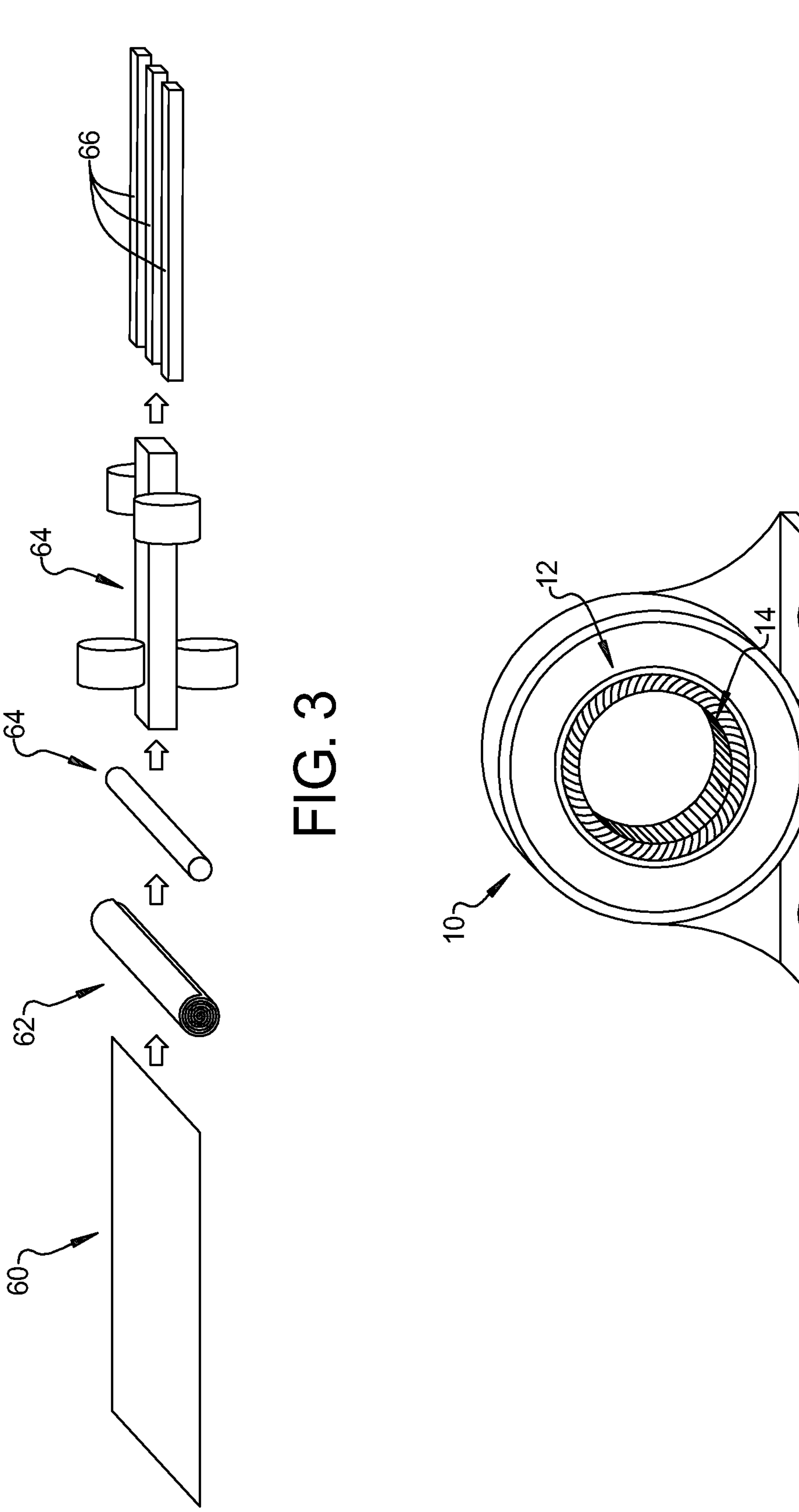
FIG. 3 is a schematic illustration of a third process of making electric motor conductor wires according to the principles of the present disclosure.
FIG. 4 is a schematic illustration of a motor stator implementing conductor wires made according to the principles of the present disclosure.

With reference to FIG. 4, an electric motor stator 10 is shown including a core 12 and a plurality of hairpin windings 14. The plurality of hairpin windings 14 can be made from a high frequency conductor wire produced by a process according to the principles of the present disclosure.

Figures 1, 2:
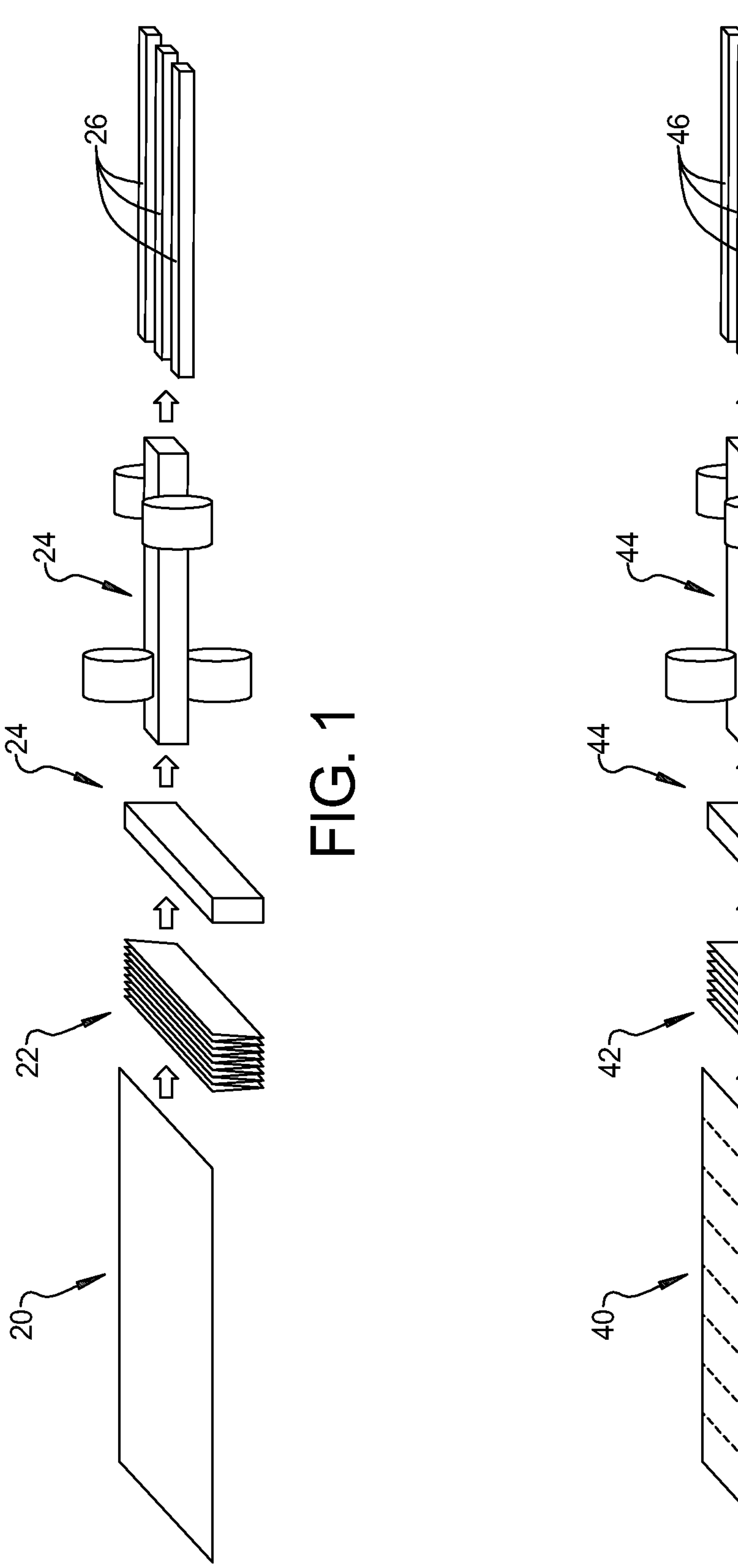
FIG. 1 is a schematic illustration of a first process of making electric motor conductor wires according to the principles of the present disclosure.
FIG. 2 is a schematic illustration of a second process of making electric motor conductor wires according to the principles of the present disclosure.

With reference to FIG. 1, a method of making the high frequency conductor wire is shown including folding an ultra-conductive copper (UCC) foil 20 is shown folded into a multiple layer folded ultra-conducting copper foil 22. The multiple layer folded ultra-conducting coper foil 22 is then cladded with one of copper and aluminum into a cladded folded ultra-conducting copper foil 24. The cladded folded ultra-conducting copper foil 24 is then plastically deformed by drawing or extrusion into one of a cladded ultra-conducting copper wire, bar, and cable 26. The ultra-conducting copper wires, bars, and cables 26 can be formed into a hairpin winding 14 that is inserted into slots of a stator core 12 of an electric motor, as shown in FIG. 4, or can otherwise be used as a high frequency electrical conductor in other applications.

The ultra-conducting copper foil 20 can include a continuous Cu tape coated with a layer of aligned carbon nanotubes. Carbon nanomaterial on or within the Cu film or thin sheet substrates may be prepared by other methods by combining carbon nanomaterials either on top or within the Cu film or thin sheet. The carbon content in the Cu-Carbon composite can be adjusted for improved electrical resistivity and/or conductivity. The ultra-conducting copper foil can be alternatively coated to provide a lower resistance than plain copper foil.

The process can include stacking a plurality of UCC foil sheets 20 and then folding the stack of UCC sheets. In addition, the UCC sheets can be stacked with plain copper sheets that are simultaneously folded into the stack of multiple layers folded ultra-conducting copper foil 22.

With reference to FIG. 2, a method of making the high frequency conductor wire is shown including stacking a plurality of strips of an ultra-conductive copper (UCC) foil 40 into a multiple layer stacked ultra-conducting copper foil 42. The multiple layers stacked ultra-conducting coper foil 42 is then cladded with one of copper and aluminum into a cladded folded ultra-conducting copper foil 44. The cladded stacked ultra-conducting copper foil 44 is then plastically deformed by drawing or extrusion into one of a cladded ultra-conducting copper wire, bar, and cable 46. The ultra-conducting copper wires, bars, and cables 46 can be formed into a hairpin winding 14 that is inserted into slots of a stator core 12 of an electric motor, as shown in FIG. 4, or can otherwise be used as a high frequency electrical conductor in other applications.

The ultra-conducting copper foil 40 can include a continuous Cu tape coated with a layer of aligned carbon nanotubes. The ultra-conducting copper foil can be alternatively coated to provide a lower resistance than plain copper foil.

The process can include stacking a plurality of UCC sheets with plain copper sheets to form the multiple layers stacked ultra-conducting copper foil 22.

With reference to FIG. 3, a method of making the high frequency conductor wire is shown including rolling an ultra-conductive copper (UCC) foil 60 is tightly rolled into a multiple layer rolled ultra-conducting copper foil 62. The multiple layer rolled ultra-conducting coper foil 62 is then cladded with one of copper and aluminum into a cladded rolled ultra-conducting copper foil 64. The cladded rolled ultra-conducting copper foil 64 is then plastically deformed by drawing or extrusion into one of a cladded ultra-conducting copper wire, bar, and cable 66. The ultra-conducting copper wires, bars, and cables 66 can be formed into a hairpin winding 14 that is inserted into slots of a stator core 12 of an electric motor, as shown in FIG. 4, or can otherwise be used as a high frequency electrical conductor in other applications.

The ultra-conducting copper foil 60 can include a continuous Cu tape coated with a layer of aligned carbon nanotubes. The ultra-conducting copper foil 60 can be alternatively coated to provide a lower resistance than plain copper foil.

The process can include stacking a plurality of UCC sheets 60 and then rolling the stack of UCC sheets. In addition, the UCC sheets can be stacked with plain copper sheets that are simultaneously rolled into the multiple layer rolled ultra-conducting copper foil 62.

Cu with carbon nanomaterial modified wire has the advantages of higher conductivity and electrical resistivity. It is expected that the electric UCC conductor materials help reduce AC losses from skin effects and proximity effects found in high-frequency windings to achieve >5% reduction in resistance, >10% increase in ampacity, and >10% improvement in strength compared with commercial copper conductors.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A method of making a conductor, comprising:

folding an ultra-conducting copper foil into a multiple layer folded ultra-conducting copper foil;

cladding the multiple layer folded ultra-conducting copper foil with one of copper and aluminum into a cladded folded ultra-conducting copper foil having a rectangular cross section; and plastically deforming the cladded folded ultra-conducting copper foil into a cladded ultra-conducting copper wire having a rectangular cross-section.

2. The method according to claim 1, further comprising forming the one of a cladded ultra-conducting copper wire, bar and cable into a hairpin winding inserted into slots of a stator core of an electric motor.

3. The method according to claim 1, wherein the ultra-conducting copper foil is made from a continuous Cu tape coated with a layer of aligned carbon nanotubes.

4. The method according to claim 1, wherein the ultra-conducing copper foil includes carbon nanomaterials on a Cu film.

5. The method according to claim 1, wherein the ultra-conducting copper foil includes a Cu thin sheet substrate prepared by combining carbon nanotubes on top of the Cu thin sheet substrate.

6. The method according to claim 1, wherein the ultra-conducting copper foil includes a Cu thin sheet substrate prepared by combining carbon nanotubes within the Cu thin sheet substrate.

7. The method according to claim 1, wherein the ultra-conducting copper foil has a coating that provides a lower resistance than copper foil.

8. The method according to claim 1, wherein the ultra-conducting copper foil is stacked with a copper foil and each of the ultra-conducting copper foil and the copper foil are folded to form the multiple layer folded ultra-conducting copper foil.

9. A method of making a conductor, comprising:

stacking an ultra-conducting copper foil into a multiple layer stacked ultra-conducting copper foil;

cladding the stacked ultra-conducting copper foil with one of copper and aluminum into a cladded stacked ultra-conducting copper foil having a rectangular cross section; and plastically deforming the cladded stacked ultra-conducting copper foil into a cladded ultra-conducting copper wire having a rectangular cross section.

10. The method according to claim 9, further comprising forming the one of a cladded ultra-conducting copper wire, bar and cable into a hairpin winding inserted into slots of a stator core of an electric motor.

11. The method according to claim 9, wherein the ultra-conducting copper foil is made from a continuous Cu tape coated with a layer of aligned carbon nanotubes.

12. The method according to claim 9, wherein the ultra-conducting copper foil has a coating that provides a lower resistance than copper foil.

13. The method according to claim 9, wherein stacking the ultra-conducting copper foil includes stacking copper foil with the ultra-conducting copper foil to form the multiple layer folded ultra-conducting copper foil.

14. A method of making a conductor, comprising:

rolling an ultra-conducting copper foil into a multiple layer rolled ultra-conducting copper foil;

cladding the rolled ultra-conducting copper foil with aluminum into a cladded rolled ultra-conducting copper foil; and plastically deforming the cladded rolled ultra-conducting copper foil into a cladded ultra-conducting copper wire having a rectangular cross section, wherein rolling the ultra-conducting copper foil includes stacking copper foil with the ultra-conducting copper foil and rolling the stack of ultra-conducting copper foil with copper foil to form the multiple layer rolled ultra-conducting copper foil.

15. The method according to claim 14, further comprising forming the one of a cladded ultra-conducting copper wire, bar and cable into a hairpin winding inserted into slots of a stator core of an electric motor.

16. The method according to claim 14, wherein the ultra-conducting copper foil is made from a continuous Cu tape coated with a layer of aligned carbon nanotubes.

17. The method according to claim 14, wherein the ultra-conducting copper foil has a coating that provides a lower resistance than copper foil.

* * * * *